(12) United States Patent
Jia et al.

(10) Patent No.: US 12,160,051 B2
(45) Date of Patent: Dec. 3, 2024

(54) LIQUID CRYSTAL ANTENNA

(71) Applicant: Shanghai Tianma Micro-Electronics Co., Ltd., Shanghai (CN)

(72) Inventors: Zhenyu Jia, Shanghai (CN); Kerui Xi, Shanghai (CN); Baiquan Lin, Shanghai (CN); Xuhui Peng, Shanghai (CN)

(73) Assignee: Shanghai Tianma Micro-Electronics Co., Ltd., Shanghai (CN)

(*) Notice: Subject to any disclaimer, the term of this patent is extended or adjusted under 35 U.S.C. 154(b) by 334 days.

(21) Appl. No.: 17/790,712

(22) PCT Filed: Oct. 30, 2020

(86) PCT No.: PCT/CN2020/125501
§ 371 (c)(1),
(2) Date: Jul. 1, 2022

(87) PCT Pub. No.: WO2022/032889
PCT Pub. Date: Feb. 17, 2022

(65) Prior Publication Data
US 2023/0052527 A1   Feb. 16, 2023

(30) Foreign Application Priority Data
Aug. 13, 2020 (CN) .......................... 202010810038.0

(51) Int. Cl.
  *H01Q 3/36* (2006.01)
  *H01P 1/18* (2006.01)
  *H01Q 1/50* (2006.01)

(52) U.S. Cl.
  CPC .................. *H01Q 3/36* (2013.01); *H01P 1/18* (2013.01); *H01Q 1/50* (2013.01)

(58) Field of Classification Search
  CPC ............... H01Q 3/36; H01Q 1/50; H01P 1/18
  (Continued)

(56) References Cited

U.S. PATENT DOCUMENTS 11,424,552 B2 * 8/2022 Chiu ........................ H01Q 1/38
2019/0051979 A1   2/2019 Lin

FOREIGN PATENT DOCUMENTS

| CN | 109164608 A | 1/2019 |
|---|---|---|
| CN | 110034358 A | 7/2019 |

(Continued)

OTHER PUBLICATIONS

International Search Report mailed May 12, 2021, issued in International Application No. PCT/CN2020/125501, filed Oct. 30, 2020, 5 pages.

*Primary Examiner* — Harry K Liu
(74) *Attorney, Agent, or Firm* — CHRISTENSEN O'CONNOR JOHNSON KINDNESS PLLC

(57) ABSTRACT

A liquid crystal antenna is described. The liquid crystal antenna includes liquid crystal phase shifter units arranged in an array; a first feeding network line corresponding to an $i^{th}$ scanning line and extending along a first direction, and/or, a second feeding network line corresponding to an $j^{th}$ data line and extending along a second direction. The first feeding network line is provided between the $i^{th}$ scanning line and an $(i+1)^{th}$ scanning line, and a scanning line protrusion protrudes toward a side facing away from the first feeding network line corresponding to the $i^{th}$ scanning line. The second feeding network line is provided between the $j^{th}$ data line and a $(j+1)^{th}$ data line, and a data line protrusion protrudes toward a side facing away from the second feeding network line corresponding to the $j^{th}$ data line.

20 Claims, 8 Drawing Sheets

(58) Field of Classification Search
USPC .......................................................... 342/372
See application file for complete search history.

(56) References Cited

FOREIGN PATENT DOCUMENTS

| EP | 3422477 A1 | 1/2019 | |
|----|----|----|----|
| WO | WO-2019088542 A1 * | 5/2019 | ................ H01P 1/18 |
| WO | 2020001519 A1 | 1/2020 | |
| WO | WO-2020015452 A1 * | 1/2020 | ........... G02F 1/1313 |

* cited by examiner

LIQUID CRYSTAL ANTENNA

CROSS-REFERENCES TO RELATED APPLICATIONS

This application is a national stage of International Application No. PCT/CN2020/125501, filed on Oct. 30, 2020, which claims priority to Chinese Patent Application No. 202010810038.0, filed on Aug. 13, 2020. Both of the aforementioned applications are incorporated herein by reference in their entireties.

TECHNICAL FIELD

The present disclosure relates to the field of liquid crystal technologies, and, particularly, relates to a liquid crystal antenna.

BACKGROUND

An antenna in the related art that uses liquid crystal to realize a phase shifting function includes an array formed by multiple liquid crystal phase shifter units. As a requirement for antenna, gain is increased, the greater the number of the liquid crystal phase shifter, the greater the number of driving signal lines, and the greater number of driving signal lines are easily coupled with the feeding network lines of the antenna, resulting in signal interference, which is not conducive to realize the miniaturization of the antenna.

SUMMARY

On the one hand, some embodiments of the present disclosure provide a liquid crystal antenna, and the liquid crystal antenna includes a plurality of liquid crystal phase shifter units arranged in an array, a plurality of data lines arranged along a first direction, a plurality of scanning lines arranged along a second direction, transistors corresponding to the plurality of liquid crystal phase shifter units, and feeding network lines. Each of the transistors includes a first terminal electrically connected to one data line of the plurality of data lines, a second terminal electrically connected to a first electrode of one liquid crystal phase shifter unit of the plurality of liquid crystal phase shifter units, and a control terminal electrically connected to one scanning line of the plurality of scanning lines. Each of the feeding network lines extends between at least two liquid crystal phase shifter units of the plurality of liquid crystal phase shifter units. The feeding network lines includes at least one first feeding network line extending along a first direction and at least one second feeding network line extending along a second direction, and the first direction intersects with the second direction. An $i^{th}$ scanning line of the plurality of scanning lines includes a scanning line protrusion, one first feeding network line of the at least one first feeding network line corresponding to the $i^{th}$ scanning line and extending in the first direction is provided between the $i^{th}$ scanning line and an $(i+1)^{th}$ scanning line of the plurality of scanning lines, the scanning line protrusion protrudes toward a side facing away from the one first feeding network line corresponding to the $i^{th}$ scanning line, and the $i^{th}$ scanning line is at least one of the plurality of scanning lines; and/or, a $j^{th}$ data line of the plurality of data lines includes a data line protrusion, one second feeding network line of the at least one second feeding network line corresponding to the $j^{th}$ data line and extending along the second direction is provided between the $j^{th}$ data line and a $(j-1)^{th}$ data line of the plurality of data lines, the data line protrusion protrudes toward a side away from the one second feeding network line corresponding to the $j^{th}$ data line, and the $j^{th}$ data line is at least one of the plurality of data lines.

BRIEF DESCRIPTION OF DRAWINGS

In order to more clearly illustrate the technical solutions in the embodiments of the present disclosure or in the related art, the accompanying drawings used in embodiments are briefly described below. The drawings described below are merely a part of the embodiments of the present disclosure. Based on these drawings, those skilled in the art can obtain other drawings without any creative effort.

DESCRIPTION OF EMBODIMENTS

In order to more clearly illustrate objectives, technical solutions, and advantages of the embodiments of the present disclosure, the technical solutions in the embodiments of the present disclosure are clearly and completely described in details with reference to the accompanying drawings.

The terms used in the embodiments of the present disclosure are merely for the purpose of describing specific embodiment, rather than limiting the present disclosure. The terms "a", "an", "the" and "said" in a singular form in the embodiments of the present disclosure and the attached claims are also intended to include plural forms thereof, unless noted otherwise.

Figure 1:
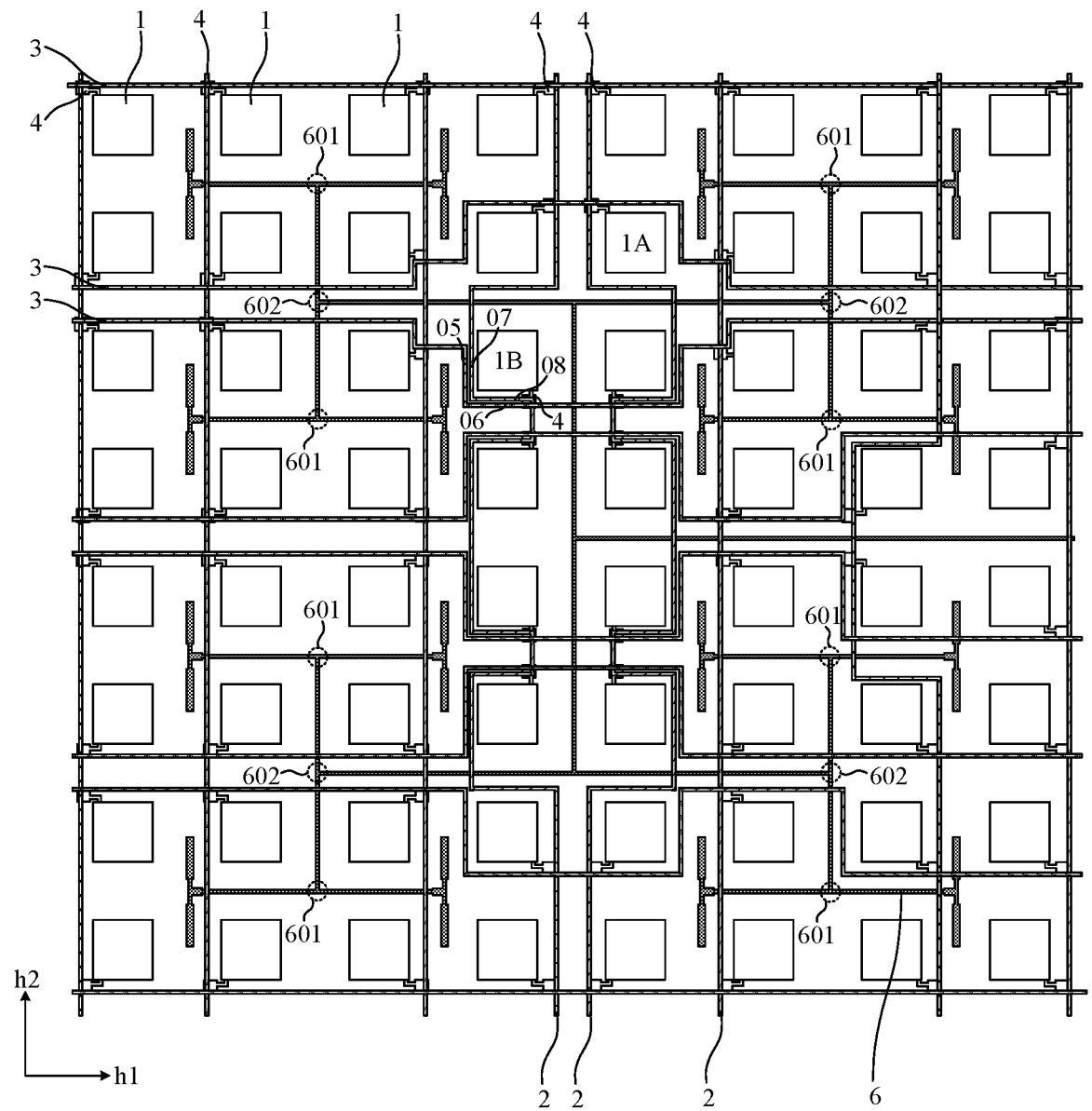
FIG. 1 is a schematic diagram of a liquid crystal antenna according to some embodiments of the present disclosure.
Figure 2:
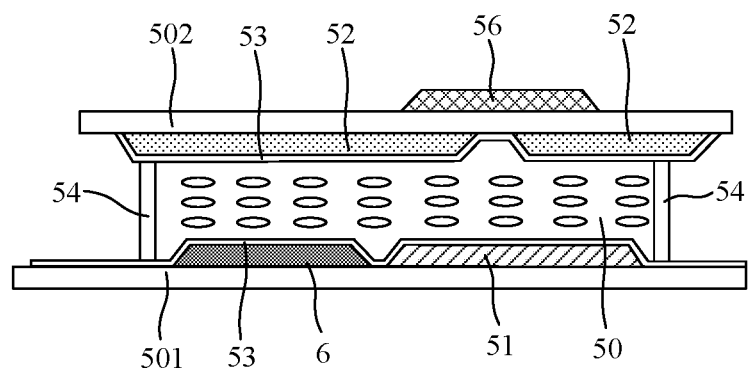
FIG. 2 is a cross-sectional view of a liquid crystal antenna in a partial region according to some embodiments of the present disclosure.
Figure 3:
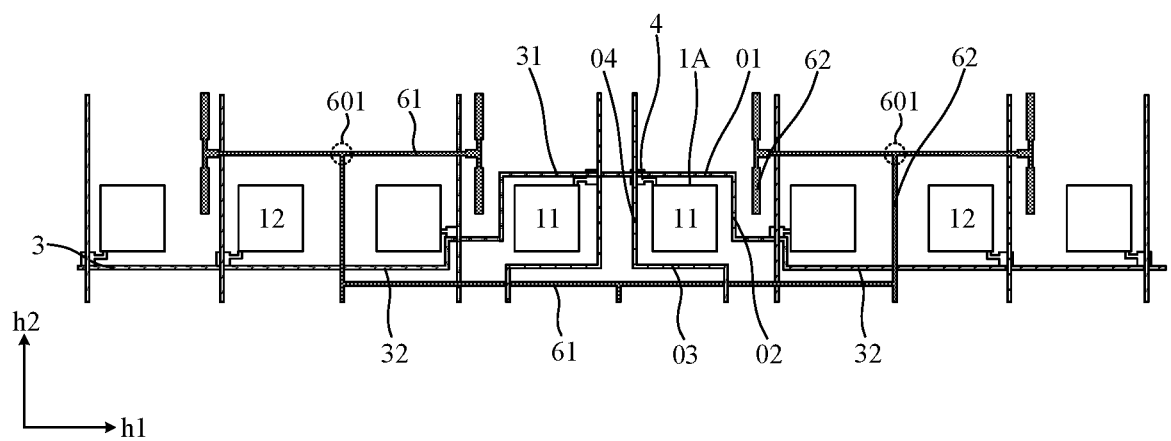
FIG. 3 is a partial schematic diagram of a peripheral region of a second scanning line shown in FIG. 1.
Figure 4:
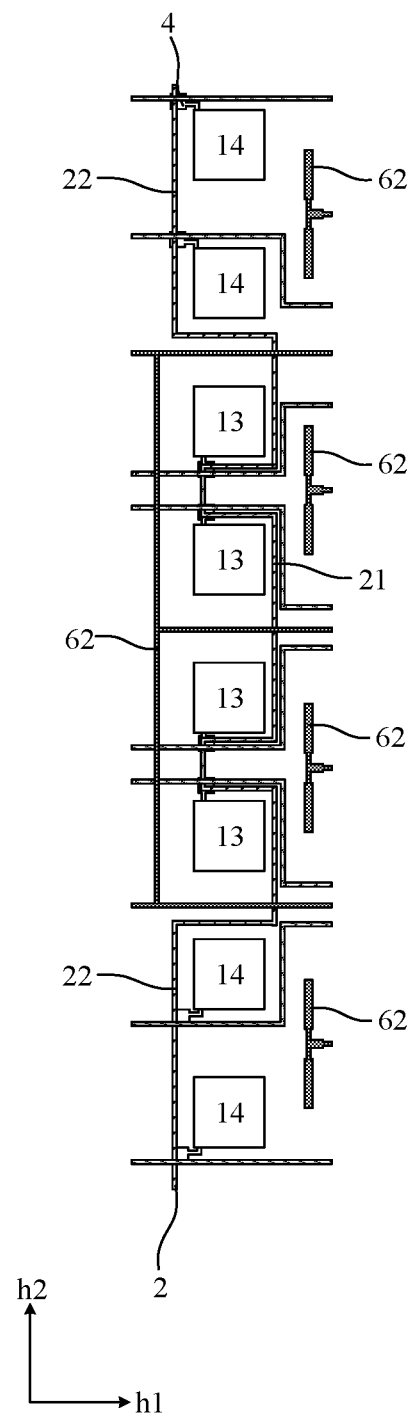
FIG. 4 is a partial schematic diagram of a peripheral region of a fourth data line shown in FIG. 1.

As shown in FIG. 1, FIG. 2, FIG. 3 and FIG. 4, FIG. 1 is a schematic diagram of a liquid crystal antenna according to some embodiments of the present disclosure, FIG. 2 is a cross-section view of a liquid crystal antenna in a partial region in some embodiments of the present disclosure schematic diagram of the structure, FIG. 3 is a partial schematic diagram of a peripheral region of a second scanning line shown in FIG. 1, and FIG. 4 is a partial schematic diagram of a peripheral region of a fourth data line shown in FIG. 1. Some embodiments of the present disclosure provide a liquid crystal antenna, and the liquid crystal antenna includes multiple liquid crystal phase shifter units 1 arranged in an array, multiple data lines 2 arranged along a first direction h1, multiple scanning lines 3 arranged along a second direction h2, transistors 4 corresponding to the multiple liquid crystal phase shifter units 1, and feeding network lines 6. A first terminal of the transistor 4 is electrically connected to a corresponding data line 2, and a second terminal of the transistor 4 is electrically connected to a first electrode 51 in the corresponding liquid crystal phase shifter unit 1. Each liquid crystal phase shifter unit 1 also includes a liquid crystal layer 50 and a second electrode 52. The liquid crystal layer 50 is located between the first electrode 51 and the second electrode 52. The first electrode 51 of each liquid crystal phase shifter unit 1 is independently arranged. The first electrode 51 can be a block electrode, or other shaped electrode, such as a serpentine-shaped electrode, a comb-shaped electrode, or a polygonal electrode. The embodiments of the present disclosure do not limit the shape of the first electrode 51. A control terminal of the transistor 4 is electrically connected to the corresponding scanning line 3. The feeding network line 6 extends between the liquid crystal phase shifter units 1. The feeding network lines 6 include a first feeding network line 61 extending along a first direction h1, and a second feeding network line 62 extending along a second direction h2. The first feeding network line 61 and the second feeding network line 62 both belong to the feeding network line 6. In an array formed by multiple liquid crystal shifter units 1, the feeding network lines 6 are distributed between the liquid crystal phase shifter units 1, and the feeding network line 6 can be coupled to the first electrode 51 of the liquid crystal phase shifter unit 1 at the end of the feeding network line. The first direction h1 intersects with the second direction h2. In some embodiments, the first direction h1 is perpendicular to the second direction h2, an $i^{th}$ scanning line 3 includes a scanning line protrusion 31, the first feeding network line 61 extending along the first direction h1 and corresponding to the $i^{th}$ scanning line 3 is provided between the $i^{th}$ scanning line 3 and an $(i+1)^{th}$ scanning line 3, the scanning line protrusion 31 protrudes toward a side facing away from the first feeding network line 61 corresponding to the $i^{th}$ scanning line 3, and the $i^{th}$ scanning line 3 is at least one of multiple scanning lines 3; and/or, a $j^{th}$ data line 2 includes a data line protrusion 21, the second feeding network line 62 extending along the second direction h2 and corresponding to the $j^{th}$ data line 2 is provided between the $j^{th}$ data line 2 and a $(j-1)^{th}$ data line 2, the data line protrusion 21 protrudes toward a side facing away from the second feeding network line 62 corresponding to the $j^{th}$ data line 2, and the $j^{th}$ The data line 2 is at least one of multiple data lines 2.

In some embodiments, the feeding network line 6 is configured to provide a high-frequency electromagnetic wave signal for the first electrode 51. When the antenna is operating, a direct current (DC) voltage is applied to each of the first electrode 51 and the second electrode 52 to generate an electric field, and the liquid crystal in a liquid crystal layer 50 is deflected under the electric field to change the phase of the electromagnetic wave, thereby realizing a phase shifting function. The voltage applied to the second electrode 52 is a fixed potential, such as ground potential. That is, the second electrode 52 is grounded, and the DC voltage on the first electrode 51 comes from the data line 2, and when taking the first direction h1 being a row direction and the second direction h2 being a column direction as an example, each row of liquid crystal phase shifter units 1 corresponds to one scanning line 3, and each column of liquid crystal phase shifter units 1 corresponds to one data line 2. Each liquid crystal phase shifter unit 1 corresponds to one transistor 4. The scanning line 3 is configured to control the corresponding transistor 4 connected to this scanning line 3 to be turned on or off. When the transistor 4 is turned on, the data line 2 corresponding to the transistor 4 is conducted with the first electrode 51 of the corresponding liquid crystal phase shifter unit 1. The DC voltage on the data line 2 can be transmitted to the first electrode 51 of the corresponding liquid crystal phase shifter unit 1 through the transistor 4. When the transistor 4 is turned off, the first electrode 51 of the corresponding liquid crystal phase shifter unit 1 is disconnected from the data line 2. The first electrode 51 stores the DC voltage value provided by the data line 2 at last time. For example, the liquid crystal phase shifter units 1 arranged in an array can be driven in a scanning manner. For example, multiple scanning lines 3 from top to bottom provide turn-on signals row by row, so that the liquid crystal phase shifter units 1 receive the voltage on the data line 2 row by row. In this way, with the cooperation between the scanning lines 3 and the data lines 2, the data line 2 can provide the corresponding voltage value to the first electrodes 51 of the liquid crystal phase shifter units 1 in a same column in a time division manner, without driving each liquid crystal phase shifter unit 1 by signal lines separately, thereby reducing the number of signal lines. Assuming that the number of scanning lines 3 is a, i can be any value selected from 1 to a-1. In the structure shown in FIG. 1, a=8, that is, there are 8 scanning lines 3 in total. The value of i is 2, 3, 4, 5, 6 and 7. That is, each of the six scanning lines 3, i.e., the second scanning line 3 to the eighth scanning line 3, has the scanning line protrusion 31. The value of i is not limited in the embodiments of the present disclosure. That is, in other embodiments, i can take any one or more values. As shown in FIG. 1 and FIG. 3, taking the structure of the peripheral region of the second scanning line 3 as an example, the first feeding network line 61 between the second scanning line 3 and the third scanning line 3, i.e., the first feeding network line 61 under the second scanning line 3 shown in FIG. 3, is the feeding network line corresponding to the second scanning line 3. The scanning line protrusion 31 of the second scanning line 3 protrudes toward a side facing away from the first feeding network line 61, that is, the second scanning line 3 protrudes upward to form a bending scanning line structure. In this way, the distance between the scanning line protrusion 31 and its corresponding first feeding network line 61 can be increased to reduce the interference between the electromagnetic wave signal transmitted on the feeding network line 6 and the signal transmitted on the scanning line 3, thereby improving the signal transmission quality of the antenna. In the structure shown in FIG. 3, a scanning line protrusion 31 protruding upwardly is located in the middle of the scanning line 3. However, the embodiments of the present disclosure do not limit the position of the scanning line protrusion 31 on the scanning line 3, as long as the scanning line 3 can bypass the corresponding first feeding network line 61 as much as possible. For example, the scanning line protrusions 31 are located at a left side and a right side of the third scanning line 3, respectively, that is, the third scanning line 3 forms scanning line protrusions 31 protruding upwardly on the left side and the right side of the third scanning line 3 so as to bypass the first feeding network line 61 below the third scanning line 3 as much as possible. Similarly, assuming that the number of data lines 2 is b, j can be any value selected from 1 to b-1. In the structure shown in FIG. 1, b=8, that is, there are eight data lines 2 in total. The value of j is 4, 5, and 7. That is, the three data lines 2 all have the data line protrusions 21, and the value of j is not limited in the embodiments of the present disclosure. That is, in other embodiments, j can take any one or more values. As shown in FIG. 1 and FIG. 4, taking the structure of the peripheral region of the fourth data line 2 as an example, the second feeding network line 62 between the fourth data line 2 and the third data line 2 (that is, the second feeding network line 62 at left side of the fourth data line 2 in FIG. 4) is the feeding network line corresponding to the fourth data line 2. The data line protrusion 21 of the fourth data line 2 protrudes toward a side facing away from the second feeding network line 62. That is, the fourth data line 2 protrudes toward the right side to form a bending data line structure. In this way, the distance between the data line protrusion 21 and the corresponding second feeding network line 62 can be increased to reduce the interference between the electromagnetic wave signal transmitted on the feeding network line 6 and the signal transmitted on the data line 2, thereby improving the transmission quality of the antenna signal.

In the embodiments of the present disclosure, the liquid crystal antenna is provided with scanning lines corresponding to each row of liquid crystal phase shifter units, data lines corresponding to each column of liquid crystal phase shifter units, and transistors corresponding to each liquid crystal phase shifter unit. During operation of the liquid crystal antenna, multiple scanning lines provide turn-on levels in sequence, and the transistors corresponding to the scanning lines having turn-on levels are turned on, so that the data lines can transmit signals to the corresponding liquid crystal phase shifter units, i.e., the data lines can transmit signals to the corresponding liquid crystal phase shifter unit in a time division manner, thereby reducing the number of data lines. By providing the protrusion of the scanning line or the protrusions of the data line, the scanning line or the data line bypasses the corresponding feeding network lines as much as possible, so that the interference between the signal transmitted on the feeding network line and the signal transmitted on other types of signal lines can be reduced to improve the signal transmission quality of the antenna, thereby facilitating the miniaturization of the antenna.

In some embodiments, the feeding network line 6 includes a first feeding terminal 601. The first feeding terminal 601 is provided between two adjacent rows of liquid crystal phase shifter units 1. Two rows of liquid crystal phase shifter units adjacent to the first feeding terminal 601 include an $n^{th}$ row of liquid crystal phase shifter units 1 and an $(n+1)^{th}$ of liquid crystal phase shifter units 1. The scanning line 3 corresponding to the $n^{th}$ row of liquid crystal phase shifter units 1 is at least partially located at a side of the $n^{th}$ row of liquid crystal phase shifter units 1 facing away from the first feeding terminal 601. The scanning line 3 corresponding to the $(n+1)^{th}$ row of liquid crystal phase shifter units 1 is at least partially located at a side of the $(n+1)^{th}$ row of liquid crystal phase shifter units 1 facing away from the first feeding terminal 601.

In some embodiments, the first feeding terminal 601 is used to form the first feeding network line 61 having different branches in different directions. The feeding network line 6 can include one or more first feeding terminals 601. For example, the first feeding terminal 601 is provided between the first row of liquid crystal phase shifter units 1 and the second row of liquid crystal phase shifter units 1. The scanning line 3 corresponding to the first row of liquid crystal phase shifter units 1 refers to the scanning line 3 connected to the first row of liquid crystal phase shifter units 1 through the transistor 4, i.e., the first scanning line 3. The scanning line 3 corresponding to the second row of liquid crystal phase shifter units 1 refers to the second scanning line 3. In the first rows of liquid crystal phase shifter units 1 and the second rows of liquid crystal phase shifter units 1, the first feeding terminal 601 is located at a lower side of the first row of liquid crystal phase shifter units 1, the first scanning line 3 is located at an upper side of the first row of liquid crystal phase shifter units 1, the first feeding terminal 601 is located at an upper side of the second row of liquid crystal phase shifter units 1, and a part of the second scanning line 3 is located at a lower side of the second row of liquid crystal phase shifter units 1. In this way, the scanning line 3 can bypass the first feeding terminal 601 as much as possible, reducing the mutual interference between the scanning line 3 and the feeding network line 6. Similarly, in the third row of liquid crystal phase shifter units 1 and the fourth row of liquid crystal phase shifter units 1, the first feeding terminal 601 is located between these two rows of liquid crystal phase shifter units 1, a part of the third scanning line 3 is located at an upper side of the third row of liquid crystal phase shifter units 1, and a part of the fourth scanning lines 3 is located at a lower side of the fourth row of liquid crystal phase shifter units 1, so that the scanning line 3 can bypass the first feeding terminal 601 as much as possible.

Figure 5:
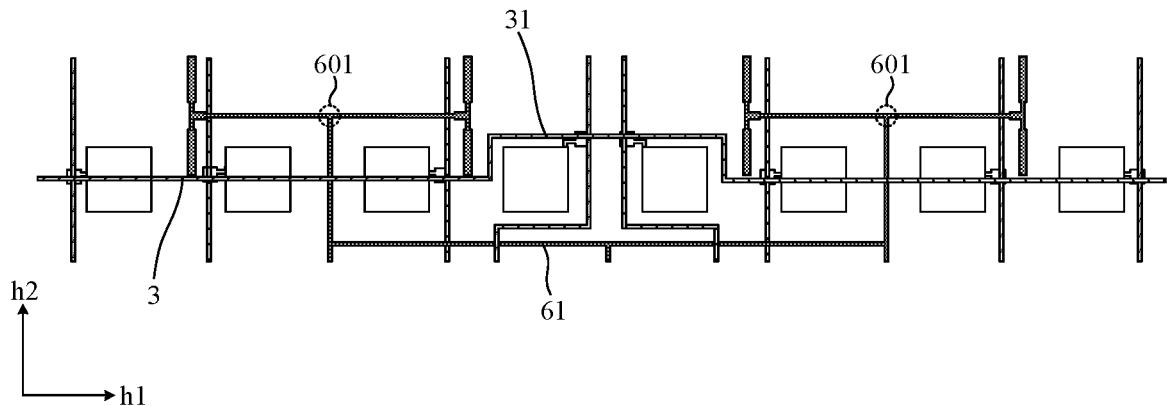
FIG. 5 is a partial schematic diagram of a liquid crystal antenna according to another embodiment of the present disclosure.

In the embodiments of the present disclosure, the scanning line 3 and the data line 2 are located outside the liquid crystal phase shifter unit 1, which is not limited in the embodiments of the present disclosure. The scanning line 3 and the data line 2 can also pass through the liquid crystal phase shifter unit 1 without defining the positions of scanning line 3 and data line 2, as long as there is no mutual influence between the scanning line 3 and the data line 2. For example, as shown in FIG. 5, which is a partial schematic diagram of a liquid crystal antenna according to another embodiment of the present disclosure, the structure shown in FIG. 5 is similar to the structure shown in FIG. 3, the difference lies in that in the structure shown in FIG. 3, the scanning line 3 is located outside of the liquid crystal phase shifter unit 1, but in the structure shown in FIG. 5, some scanning lines 3 pass through the liquid crystal phase shifter unit 1.

In some embodiments, the feeding network line 6 includes a second feeding terminal 602 provided between two adjacent columns of liquid crystal phase shifter units 1. Two columns of liquid crystal phase shifter units 1 adjacent to the second feeding terminals 602 include an $m^{th}$ column of liquid crystal phase shifter units 1 and an $(m+1)^{th}$ column of liquid crystal phase shifter units 1. The data line 2 corresponding to the liquid crystal phase shifter unit 1 of the $m^{th}$ column is at least partially located at a side of the $m^{th}$ column of liquid crystal phase shifter units 1 facing away from the second feeding terminal 602, and the data line 2 corresponding to the $(m+1)^{th}$ column of liquid crystal phase shifter units 1 is at least partially located at a side of the $(m+1)^{th}$ column of the liquid crystal phase shifter units 1 facing away from the second feeding terminal 602.

In some embodiments, the second feeding terminal 602 is uses to form the second feeding network line 62 having branches in different directions. The feeding network line 6 can include one or more second feeding terminals 602. For example, a second feeding terminal 602 is provided between the second column of phase shifter units 1 and the third column of liquid crystal phase shifter units 1. In these two columns, the second data line 2 is located at a side of the second column of liquid crystal phase shifter units 1 facing away from the second feeding terminal 602, that is, the second data line 2 is located at a left side of the second column of liquid crystal phase shifter units 1. The third data line 2 is located at a side of the third column of liquid crystal phase shifter units 1 facing away from the second feeding terminal 602, that is, the third data line 2 is located at a right side of the third column of liquid crystal phase shifter units 1. In this way, the data line 2 can bypass the second feeding terminal 602 as much as possible, so that the mutual interference between the data line 2 and the feeding network lines 6 can be reduced.

In some embodiments, at least one transistor 4 of the transistors 4 that correspond to the $n^{th}$ row of liquid crystal phase shifter units 1 is located at a side of the $n^{th}$ row of liquid crystal phase shifter units 1 facing away from the first feeding terminal 601, and at least one transistor 4 of the transistors 4 that correspond to the $(n+1)^{th}$ row of liquid crystal phase shifter units 1 are located at a side of the $(n+1)^{th}$ row of liquid crystal phase shifter units 1 facing away from the first feeding terminal 601.

In some embodiments, for example, in the first row of liquid crystal phase shifter units 1 and the second row of liquid crystal phase shifter units 1, the first feeding terminal 601 is located between these two rows of liquid crystal phase shifter units 1, the transistors 4 corresponding to the first row of liquid crystal phase shifter units 1 are all located at an upper side of the first row of liquid crystal phase shifter units 1, and at least one of the transistors 4 that correspond to the second row of liquid crystal phase shifter units 1 is located at a lower side of the second row of liquid crystal phase shifter units 1. In this way, the transistors 4 can bypass the first feeding terminal 601 as much as possible, and the interference of the signal transmitted on the feeding network line 6 to the transistor 4 can be reduced, that is, it is, as much as possible, avoided that the transistor 4 generates a leakage current or operates in an abnormal working state due to coupling interference of signals on the feeding network line 6.

In some embodiments, at least one of the transistors 4 that correspond to the $m^{th}$ column of liquid crystal phase shifter units 1 is located at a side of the $m^{th}$ column of liquid crystal phase shifter units 1 facing away from the second feeding terminal 602, and at least one of the transistors 4 that correspond to the $(m+1)^{th}$ column of liquid crystal phase shifter units 1 is located at a side of the second column of liquid crystal phase shifter units 1 facing away from the second feeding terminal 602.

In some embodiments, for example, the second feeding terminal 602 is provided between the second column of liquid crystal phase shifter units 1 and the third column of liquid crystal phase shifter units 1. In these two columns, the transistors 4 corresponding to the second column of liquid crystal phase shifter units 1 are located at a side of the second column of liquid crystal phase shifter units 1 away from the second feeding terminal 602, that is, the transistors 4 corresponding to the second column of liquid crystal phase shifter units 1 are located at a left side of the second column of the liquid crystal phase shifter units 1. The transistors 4 corresponding to the third column of liquid crystal phase shifter units 1 are located at a side of the third column of liquid crystal phase shifter units 1 away from the second feeding terminal 602, that is, the transistors 4 corresponding to the third column of liquid crystal phase shifter units 1 are located at a right side of the third column of the liquid crystal phase shifter units 1. In this way, the transistors 4 can bypass the second feeding terminal 602 as much as possible, and the interference of the signal transmitted on the feeding network line 6 to the transistor 4 is reduced, that is, it is, as much as possible, avoided that the transistor 4 generates a leakage current or operates in an abnormal working state due to coupling interference of signals on the feeding network line 6.

In some embodiments, the $i^{th}$ scanning line 3 is electrically connected to an $i^{th}$ row of liquid crystal phase shifter units 1, the $i^{th}$ row of liquid crystal phase shifter units 1 include at least one first liquid crystal phase shifter unit 11 and at least one second liquid crystal phase shifter unit 1. In the second direction h2, the first feeding network line 61 adjacent to the first liquid crystal phase shifter unit 11 is located at a first side of the first liquid crystal phase shifter unit 11, a scanning line protrusion 31 is located at a second side of the first liquid crystal phase shifter unit 11, and the first side and the second side are two opposite sides of the $i^{th}$ row of liquid crystal phase shifter units 1 in the second direction h2.

In some embodiments, for example, in the structure shown in FIG. 3, the first side refers to a lower side, and the second side refers to an upper side. The second row of liquid crystal phase shifter units 1 includes two first liquid crystal phase shifter units 11 and two second liquid crystal phase shifter units 12. The first feeding network line 61 adjacent to the first liquid crystal phase shifter unit 11 refers to the first feeding network line 61 closest to the first liquid crystal phase shifter unit 11. The first feeding network line 61 is located at a lower side of the first liquid crystal phase shifter unit 11. The scanning line protrusion 31 of the second row of scanning lines 3 is located at an upper side of the first liquid crystal phase shifter unit 11. In this way, the scanning line 3 can bypass the nearby first feeding network line 61 as much as possible, thereby reducing the interference between the scanning line 3 and the first feeding network line 61.

In some embodiments, the $i^{th}$ scanning line 3 includes a scanning line non-protrusion 32 located at a first side of the second liquid crystal phase shifter unit 12, and the first feeding network line 61 adjacent to the second liquid crystal phase shifter unit 12 is located at a second side of the second liquid crystal phase shifter unit 12.

In some embodiments, also taking the second row of liquid crystal phase shifter units 1 shown in FIG. 1 and FIG. 3 as an example, for the second liquid crystal phase shifter unit 12 therein, the first feeding network line 61 adjacent to the second liquid crystal phase shifter unit 12 refers to a first feeding network line 61 closest to the second liquid crystal phase shifter unit 12, and is located at an upper side of the second liquid crystal phase shifter unit 12. The scanning line non-protruding portion 32 is located at a lower side of the second liquid crystal phase shifter unit 12. In this way, the scanning line 3 can bypass the nearby first feeding network line 61 as much as possible, thereby reducing the interference between the scanning line 3 and the first feeding network line 61.

In some embodiments, the $j^{th}$ data line 2 is electrically connected to the $j^{th}$ column of liquid crystal phase shifter units 1, the $j^{th}$ column of liquid crystal phase shifter units 1 include at least one third liquid crystal phase shifter unit 13 and at least one fourth liquid crystal phase shifter unit 1. In the first direction h1, at least one second feeding network line 62 adjacent to the third liquid crystal phase shifter unit 13 is located at a third side of the third liquid crystal phase shifter unit 13, and the data line protrusion 21 is located at a fourth side of the third liquid crystal phase shifter unit 13. The third side and the fourth side are two opposite sides of the $j^{th}$ column of liquid crystal phase shifter units 1 in the first direction h1, respectively.

In some embodiments, for example, in the structure shown in FIG. 4, the third side refers to a left side, and the fourth side refers to a right side. The fourth column of liquid crystal phase shifter units 1 include four third liquid crystal phase shifter units 13 and four fourth liquid crystal phase shifter units 14. The second feeding network line 62 adjacent to the third liquid crystal phase shifter unit 13 refers to a second feeding network line 62 closest to the third liquid crystal phase shifter unit 13. At least one second feeding network line 62 is located at a left side of the third liquid crystal phase shifter unit 13. The data line protrusion 21 of the fourth data line 2 is located at a right side of the third liquid crystal phase shifter unit 13. In this way, the data line 2 can bypass the nearby second feeding network line 62 as much as possible, thereby reducing the interference between the data line 2 and the second feeding network line 62.

In some embodiments, the $j^{th}$ data line 2 includes a data line non-protrusion 22 located at a third side of the fourth liquid crystal phase shifter unit 14, and the second feeding network line 62 adjacent to the fourth liquid crystal phase shifter unit 14 is located at a fourth side of the fourth liquid crystal phase shifter unit 14.

In some embodiments, also taking the fourth column of data lines 2, that is, the structure shown in FIG. 4 as an example, for the fourth liquid crystal phase shifter unit 14 therein, the second feeding network line 62 adjacent to the fourth liquid crystal phase shifter unit 14 refers to a second feeding network line 62 closest to the fourth liquid crystal phase shifter unit 14. The second feeding network line 62 is located at a right side of the fourth liquid crystal phase shifter unit 14. The data line non-protrusion 22 in the fourth data line 2 is located at a left side of the fourth liquid crystal phase shifter unit 14. In this way, the data line 2 can bypass the nearby second feeding network line 62 as much as possible, thereby reducing the interference between the data line 2 and the second feeding network line 62.

In some embodiments, the $(m-1)^{th}$ column of liquid crystal phase shifter units 1 is electrically connected to the $(m-1)^{th}$ data line 2, and is located between the $(m-1)^{th}$ data line 2 and the $m^{th}$ data line 2.

In some embodiments, as shown in FIG. 1, for example, taking m=2 as an example, an end of the feeding network line 6 is provided between the first column of liquid crystal phase shifter units 1 and the second column of liquid crystal phase shifter units 1. The end of the feeding network line 6 is configured to feed the first electrodes 51 of the liquid crystal phase shifter units 1 that are located at the left side and the right side of the end of the feeding network line 6, so that the first column of liquid crystal phase shifter units 1 is located between the first data line 2 and the second data line 2. In this way, the first data line 2 can bypass the feeding network line 6 as much as possible to reduce the interference between the first data line 2 and the feeding network line 6. For the second column of liquid crystal phase shifter units 1, since the feeding network lines 6 are provided at left and right sides of the second column of liquid crystal phase shifter units 1, that is to say, the second data line 2 cannot completely bypass the feeding network line 6, and can be provided at a left side of the second column of liquid crystal phase shifter units 1.

In some embodiments, as shown in FIG. 1 and FIG. 3, the $i^{th}$ scanning line 3 and the $j^{th}$ data line 2 are electrically connected to a first specific liquid crystal phase shifter unit 1A through the corresponding transistor 4, the $i^{th}$ scanning line 3 includes a first segment 01 extending in the direction h1 and a second segment 02 extending along the second direction h2, the first segment 01 is connected to the second segment 02, the first segment 01 is located between the first specific liquid crystal phase shifter unit 1A and the $(i-1)^{th}$ row of liquid crystal phase shifter units 1, and the second segment 02 is located between the first specific liquid crystal phase shifter unit 1A and the $(j+1)^{th}$ column of liquid crystal phase shifter units 1. The $j^{th}$ data line 2 includes a third segment 03 extending in the first direction h1 and the fourth segment 04 extending in the second direction h2, the third segment 03 is connected to the fourth segment 04, the third segment 03 is located between the first specific liquid crystal phase shifter unit 1A and the $(i+1)^{th}$ row of liquid crystal phase shifter units 1, the fourth segment 04 is located between the first specific liquid crystal phase shifter unit 1A and the $(j-1)^{th}$ column of liquid crystal phase shifter units 1, and the transistor 4 corresponding to the first specific liquid crystal phase shifter unit 1A is located at a junction between the first segment 01 and the fourth segment 04.

In some embodiments, taking i=2, and j=5 as an example, that is to say, the liquid crystal phase shifter unit in the second row and the fifth column is the first specific liquid crystal phase shifter unit 1A, and the first segment 01 and the second segment 02 have different extension direction, i.e., being used to form the scanning line protrusion 31. The feeding network line 6 is bypassed as much as possible by bending the scanning line 3. The third section 03 and the fourth section 04 have different extension directions, i.e., being used to form the data line protrusion. The feeding network line 6 is bypassed as much as possible by bending the data line 2. The transistor 4 is configured to transmit the signal on the data line 2 to the corresponding liquid crystal phase shifter unit 1 under control of the scanning line 3, therefore, the transistor 4 corresponding to the first specific liquid crystal phase shifter unit 1A can be provided at the junction between the data line 2 and the scanning line 3.

In some embodiments, as shown in FIG. 1 and FIG. 3, a second feeding network line 62 is provided between the first specific liquid crystal phase shifter unit 1A and the (j+1)th column of liquid crystal phase shifter units 1, a first feeding network line 61 is provided between a specific liquid crystal phase shifter unit 1A and the $(i+1)^{th}$ of liquid crystal phase shifter units 1, and there is no feeding network line 6 provided between the first specific liquid crystal phase shifter unit 1A and the $(j-1)^{th}$ column of liquid crystal phase shifter units 1.

In some embodiments, also taking i=2, j=5 as an example, the feeding network line 6 is provided at the adjacent positions of the lower side and the right side of the first specific liquid crystal phase shifter unit 1A, and there is no feeding network line 6 is provided at the adjacent positions of the left side and the upper side of the first specific liquid crystal phase shifter unit 1A. Therefore, setting the corresponding transistor 4 at the upper left corner of the first specific liquid crystal phase shifter unit 1A can make the transistor 4 bypass the scanning line 3 and data line 2 that are adjacent to this transistor 4 as much as possible, thereby reducing the adverse effect of other signal lines on the transistor 4.

In some embodiments, as shown in FIG. 1, the $i^{th}$ scanning line 3 and the $j^{th}$ data line 2 are electrically connected to a second specific liquid crystal phase shifter unit 1B through a corresponding transistor 4. The $i^{th}$ scanning line 3 includes a fifth segment 05 extending along the first direction h1 and a sixth segment 06 extending along the second direction h2. The fifth segment 05 is connected to the sixth segment 06. The fifth segment 05 is located between a second specific liquid crystal phase shifter cell 1B and the $(i+1)^{th}$ row of liquid crystal phase shifter units 1. The sixth segment 06 is located between the second specific liquid crystal phase shifter unit 1B and the $(j-1)^{th}$ column of liquid crystal phase shifter units 1. The $j^{th}$ data line 2 includes a seventh segment 07 extending along the first direction h1 and an eighth segment 08 extending along the second direction h2. The seventh segment 07 is connected to the eighth segment 08, and is located between the second specific liquid crystal phase shifter unit 1B and the $(i+1)^{th}$ row of liquid crystal phase shifter units 1. The eighth segment 08 is located between the second specific liquid crystal phase shifter unit 1B and the $(j-1)^{th}$ column of liquid crystal phase shifter units 1. The transistor 4 corresponding to the second specific liquid crystal phase shifter unit 1B is located at an end of the fifth segment 05 facing away from the sixth segment 06.

In some embodiments, taking i=3, j=4 as an example, that is, the liquid crystal phase shifter unit 1 in the third row and the fourth column is a second specific liquid crystal phase shifter unit 1B. The fifth segment 05 and the sixth segment 06 have different extension directions, that is, being used to form the scanning line protrusion 31. The feeding network lines 6 are bypassed as much as possible by bending the scanning lines 3. The seventh segment 07 and the eighth segment 08 have different extension directions, that is, being used to form the data line protrusion. The feeding network line 6 is bypassed as much as possible by bending of the data line 2. The seventh segment 07 and the fifth segment 05 are arranged side by side on the left side of the second specific liquid crystal phase shifter unit 1B. The eighth segment 08 and the sixth segment 06 are arranged side by side at the lower side of the second specific liquid crystal phase shifter unit 1B. Therefore, the transistor 4 can be arranged at an end of the fifth segment 05 away from the sixth segment 06. Herein, the transistor 4 can be electrically connected to the scanning line 3, the data line 2, and the second specific liquid crystal phase shifter unit 1B.

In some embodiments, as shown in FIG. 1, a second feeding network line 62 is provided between the second specific liquid crystal phase shifter unit 1B and the $(j-1)^{th}$ column of liquid crystal phase shifter units 1, a first feeding network line 61 is provided between the second specific liquid crystal phase shifter unit 1B and the $(i-1)^{th}$ row of liquid crystal phase shifter units 1, and there is no feeding network line 6 provided between the second specific liquid crystal phase shifter unit 1B and the $(j+1)^{th}$ column of liquid crystal phase shifter units 1.

In some embodiments, also taking i=3, j=4 as an example, the feeding network lines 6 are provided at the adjacent positions on the upper side and the left side of the second specific liquid crystal phase shifter unit 1B, and no feeding network line 6 is provided at the lower side of the second specific liquid crystal phase shifter unit 1B. Therefore, setting the corresponding transistor 4 at the lower right corner of the second specific liquid crystal phase shifter unit 1B can make the transistor 4 bypass the adjacent scanning line 3 and data line 2 as much as possible, thereby reducing the adverse effect of other signal lines on transistor 4.

In some embodiments, as shown in FIG. 1 and FIG. 2, each liquid crystal phase shifter unit 1 includes a first electrode 51, a liquid crystal layer 50, and a second electrode 52, the first electrode 51 and the second electrode 52 are respectively located at opposite sides of the liquid crystal layer 50, the feeding network line 6 is provided in a same layer as the first electrode 51 of the corresponding liquid crystal phase shifter unit 1, and there is no gap between the feeding network line 6 and the first electrode 51.

In some embodiments, an alignment layer 53 can be provided between the first electrode 51 and the liquid crystal layer 50, and between the second electrode 52 and the liquid crystal layer 50. The alignment layer 53 is configured to perform initial alignment of the liquid crystal in the liquid crystal layer 50. The second Electrode 52 is configured to connect to a fixed potential, such as grounding. For the first electrode 51, on the one hand, when the corresponding transistor 4 is turned on, the first electrode 51 can receive the DC voltage signal transmitted by the data line 2 and store it. During operation, an electric field is generated between the potential on the first electrode 51 and the ground potential on the second electrode 52, to drive the liquid crystal of the liquid crystal layer 50 to deflect. On the other hand, there is a gap between the first electrode 5 and the feeding network line 6, so that the coupling connection between the feeding network line 6 and the first electrode 51 is achieved through the gap. A high-frequency signal is fed to the first electrode 51 by means of coupling feeding, and the deflection of the liquid crystal can adjust the phase of the high-frequency signal, thereby realizing phase shift effect.

In some embodiments, as shown in FIG. 1 and FIG. 2, the antenna further includes a first substrate 501 and a second substrate 502 opposite to the first substrate 501. The data line 2 and the first electrode 51 are located at a side of the first substrate 501 close to the second substrate 502. The second electrode 52 is located at a side of the second substrate 502 close to the first substrate 501. The liquid crystal layer 50 is located between the second electrode 52 and the first electrode 51. The first substrate 501 is configured to provide a substrate of the first electrode 51 and related structures and to be a supporting structure. The second substrate 502 is configured to provide a substrate of the second electrode 52 and related structures and to be a supporting structure. An encapsulation layer 54 is also provided between the first substrate 501 and the second substrate 502. The encapsulation layer 54 is configured to seal the liquid crystal layer 50. The encapsulation layer 54 can be a sealant in which silicon ball or conductive gold ball can be added, which is not limited herein.

Figure 6:
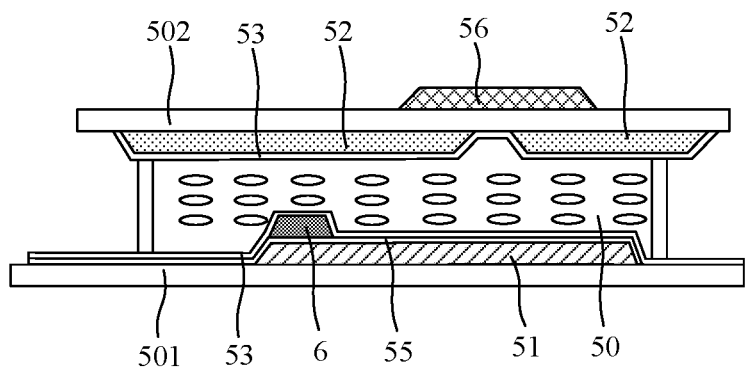
FIG. 6 is a cross-sectional view of a liquid crystal antenna in a partial region according to another embodiment of the present disclosure.

In some embodiments, as shown in FIG. 1 and FIG. 6, FIG. 6 is a cross-sectional view of a liquid crystal antenna in a partial region according to another embodiment of the present disclosure, and each liquid crystal phase shifter unit 1 includes a first electrode 51, a liquid crystal layer 50, and a second electrode 52. The first electrode 51 and the second electrode 52 are respectively located at opposite sides of the liquid crystal layer 50. The antenna includes a first substrate 501 and a second substrate 502 opposite to the first substrate 501. The first electrode 51 is located at a side of the liquid crystal layer 50 close to the first substrate 501. The second electrode 52 is located at a side of the liquid crystal layer 50 close to the second substrate 502. The feeding network line 6 is located between the liquid crystal layer 50 and the first substrate 501. The feeding network line 6 and the first electrode 51 are provided at different layers with intervals and overlap with each other.

In some embodiments, the structure shown in FIG. 6 is similar to the structure shown in FIG. 2, the difference lies in that the in the structure shown in FIG. 2, the feeding network line 6 and the first electrode 51 are provided at different layers with intervals, so that the coupling connection between the feeding network line 6 and the first electrode 51 is beneficial to the reduction of the thickness of the overall structure. In the structure shown in FIG. 6, the feeding network line 6 and the first electrode 51 are provided at different layers with intervals, so as to realize the coupling connection between the feeding network line 6 and the first electrode 51, which is beneficial to save the space in a direction perpendicular to the thickness direction.

Figure 7:
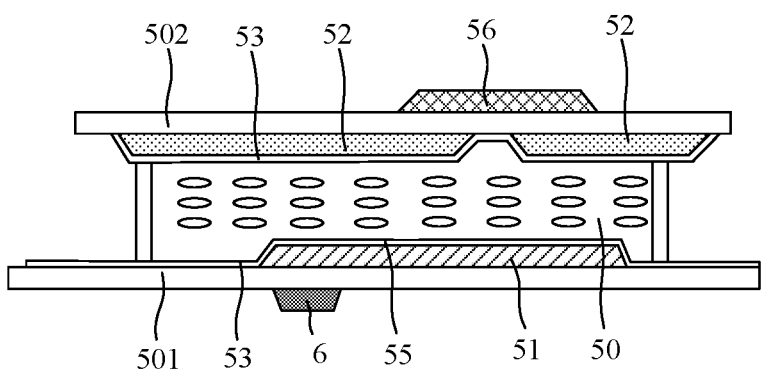
FIG. 7 is a cross-sectional view of a liquid crystal antenna in a partial region according to another embodiment of the present disclosure.
Figure 8:
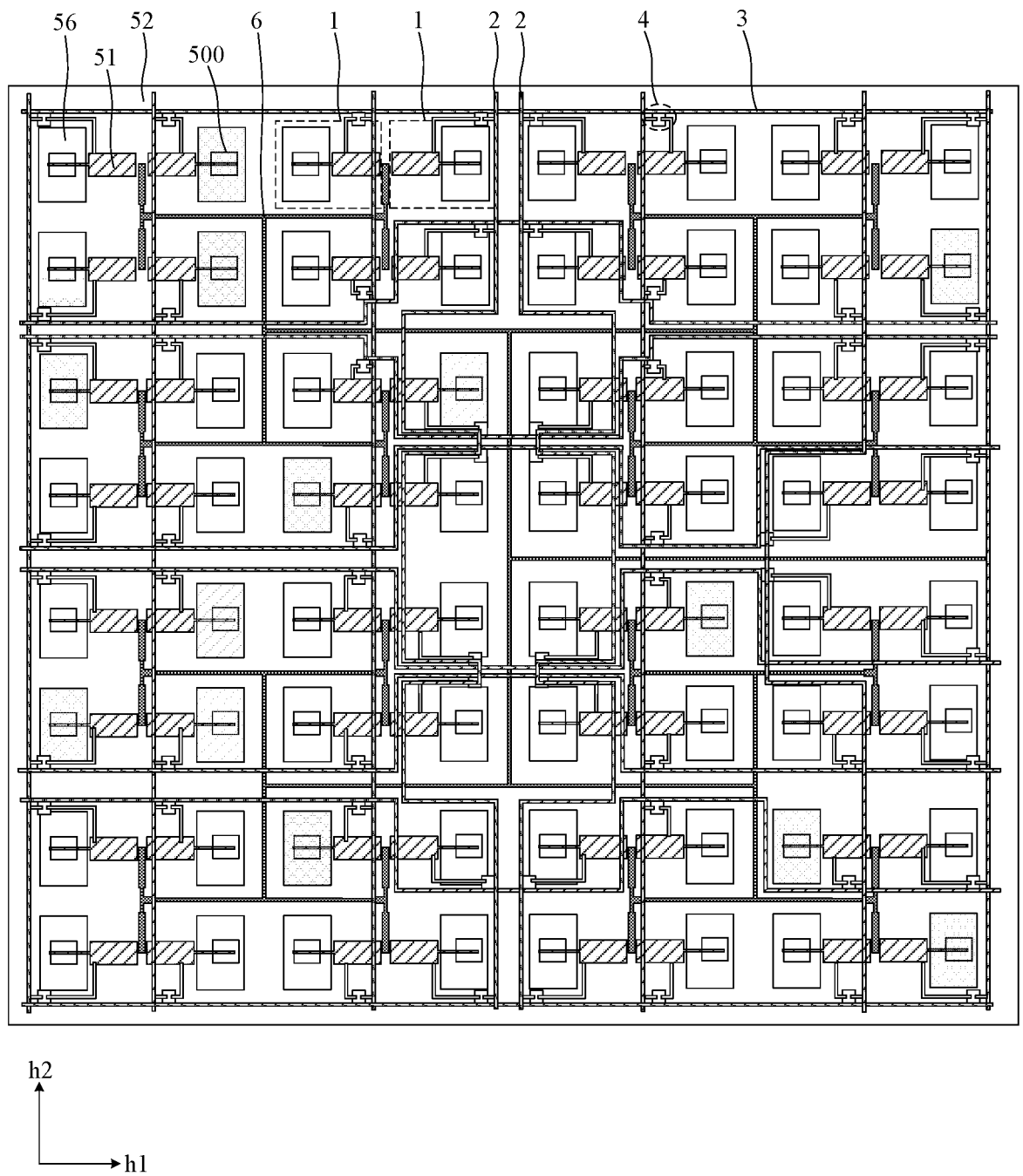
FIG. 8 is another schematic diagram of the liquid crystal antenna shown in FIG. 1.

In some embodiments, as shown in FIG. 1 and FIG. 7, FIG. 7 is a cross-sectional view of a liquid crystal antenna in a partial region according to another embodiment of the present disclosure, and each liquid crystal phase shifter unit 1 includes a first electrode 51, a liquid crystal layer 50, and a second electrode 52. The first electrode 51 and the second electrode 52 are respectively located at opposite sides of the liquid crystal layer 50. The antenna can include a first substrate 501 and a second substrate 502 opposite to the first substrate 501. The first electrode 51 is located at a side of the liquid crystal layer 50 close to the first substrate 501. The second electrode 52 is located at a side of the liquid crystal layer 50 close to the second substrate 502. The first substrate 501 is located between the feeding network line 6 and the liquid crystal layer 50. The feeding network line 6 overlaps with the first electrode 51.

In some embodiments, the structure shown in FIG. 7 is similar to the structure shown in FIG. 6, the difference lies in that, in the structure shown in FIG. 7, the first electrode 51 and the feeding network line 6 are located at opposite sides of the first substrate 501. The insulation between the first electrode 51 and the feeding network line 6 is achieved by the spacing effect of the first substrate 501 itself, without providing additional insulating layer. However, two sides of the first substrate 501 are required to manufacture a structure, which is easy to cause structural damage. In the structure shown in FIG. 6, the first electrode 51 and the feeding network line 6 are located at a same side of the first substrate 501, although an additional feed insulating layer 55 is required to be manufactured, flipping the first substrate 501 is not required during manufacturing, thereby reducing the probability of structural damage.

In some embodiments, as shown in FIG. 2, FIG. 6 and FIG. 7, each liquid crystal phase shifter unit includes a radiator 56 located at a side of the second substrate 502 away from the liquid crystal layer 50, and the second electrode 52 is provided with a hollow structure 500 corresponding to the radiator 56.

In some embodiments, at the hollow structure 500, a coupling connection is achieved between the radiator 56 and the first electrode 51, so that the first electrode 51 can radiate high-frequency electromagnetic wave signals through the radiator 56, and at the same time, in the process, the liquid crystal layer 50 can adjust the phase of the signal therein, that is, the function of the liquid crystal antenna is realized.

Figure 9:
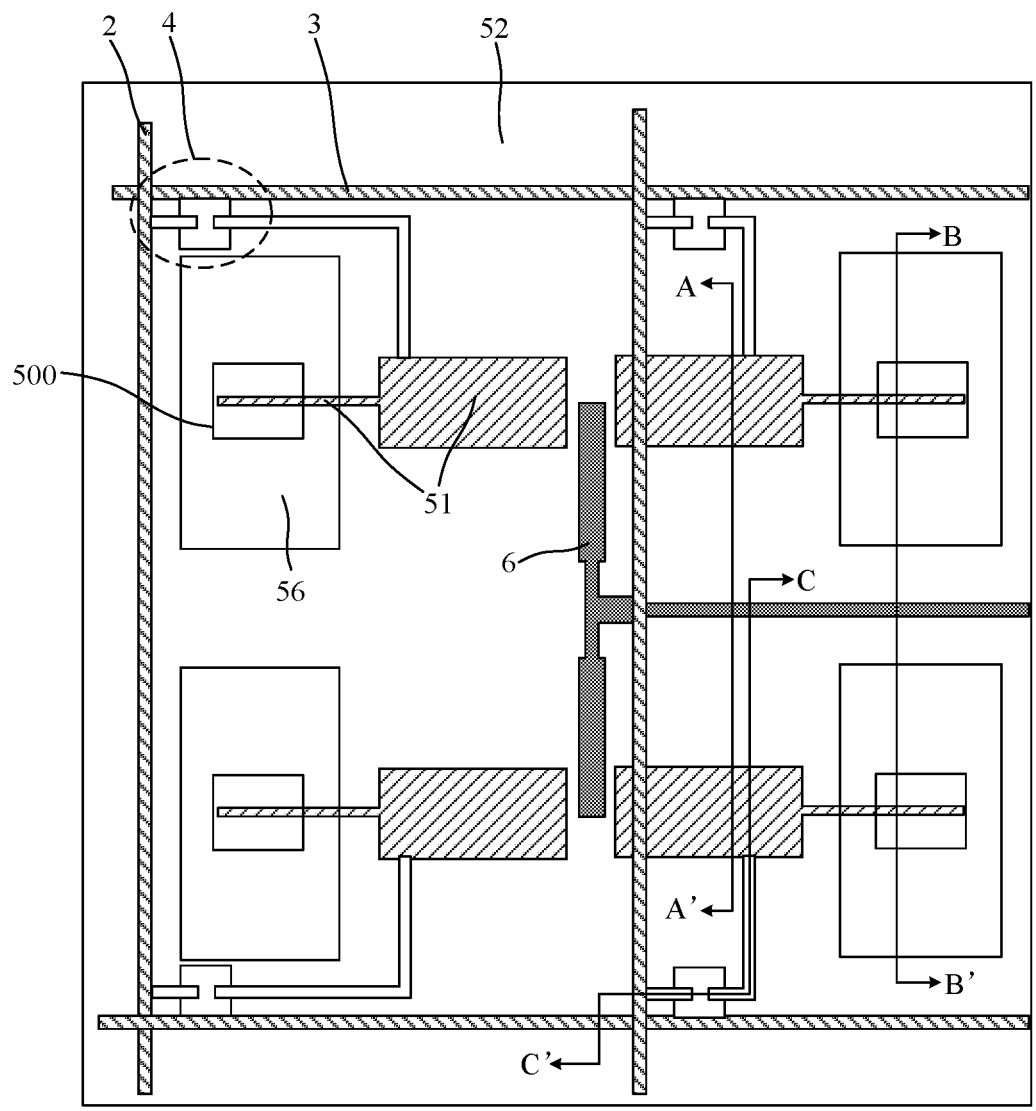
FIG. 9 is an enlarged schematic diagram of a partial region shown in FIG. 8.
Figure 10:
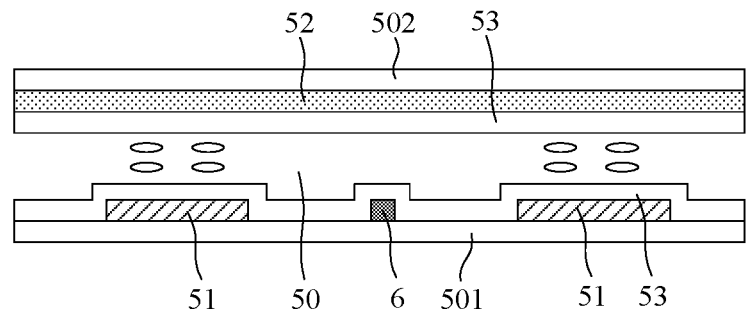
FIG. 10 is a cross-sectional view along line AA' shown in FIG. 9.
Figure 11:
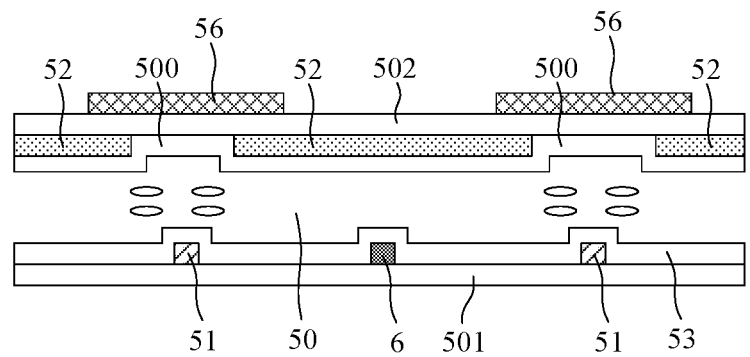
FIG. 11 is a cross-sectional view along line BB' shown in FIG. 9.

A structure of the liquid crystal phase shifter unit 1 will be described below with reference to the drawings. As shown in FIG. 8, FIG. 9, FIG. 10 and FIG. 11, FIG. 8 is another schematic diagram of the liquid crystal antenna shown in FIG. 1, FIG. 9 is an enlarged schematic diagram of a partial region shown in FIG. 8; FIG. 10 is a cross-sectional view of AA' shown in FIG. 9, and FIG. 11 is a cross-sectional view of BB' shown in FIG. 9. In the structure shown in FIG. 8 to FIG. 11, the first electrode 51 includes two parts. One part with a larger area is the part of first electrode 51 shown in FIG. 10, and is opposite to the second electrode 52. The first electrode and the second electrode jointly drive the liquid crystal to rotate, and are mainly configured to achieve phase shifting. The other part with a smaller area is the first electrode 51 shown in FIG. 11, and is opposite to the hollow structure 500 and the radiator 56, so that it is mainly configured to realize the coupling effect with the radiator 56, and the electromagnetic waves is radiated through the radiator 56 after the phase shift. The attached drawing is only a schematic diagram of the structure of the first electrode, and the shape of the first electrode can also be a serpentine, comb, polygon, etc., which are not limited herein.

Figure 12:
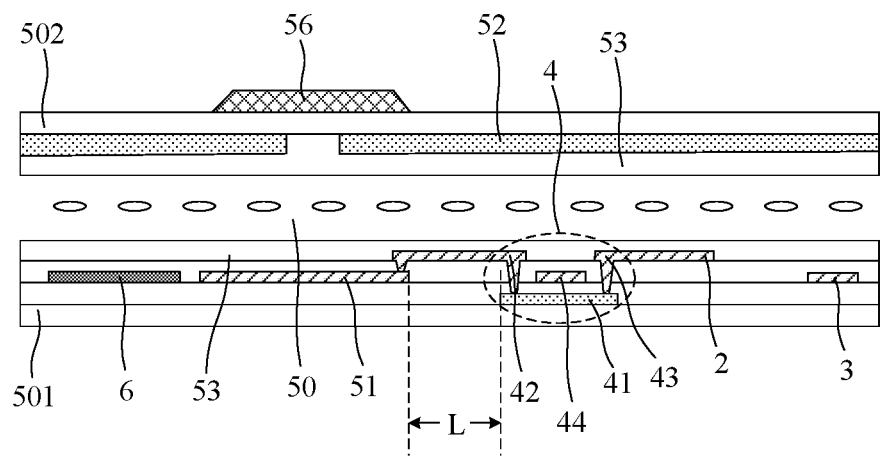
FIG. 12 is a cross-sectional view of a liquid crystal antenna in a partial region including transistors according to some embodiments of the present disclosure.
Figure 13:
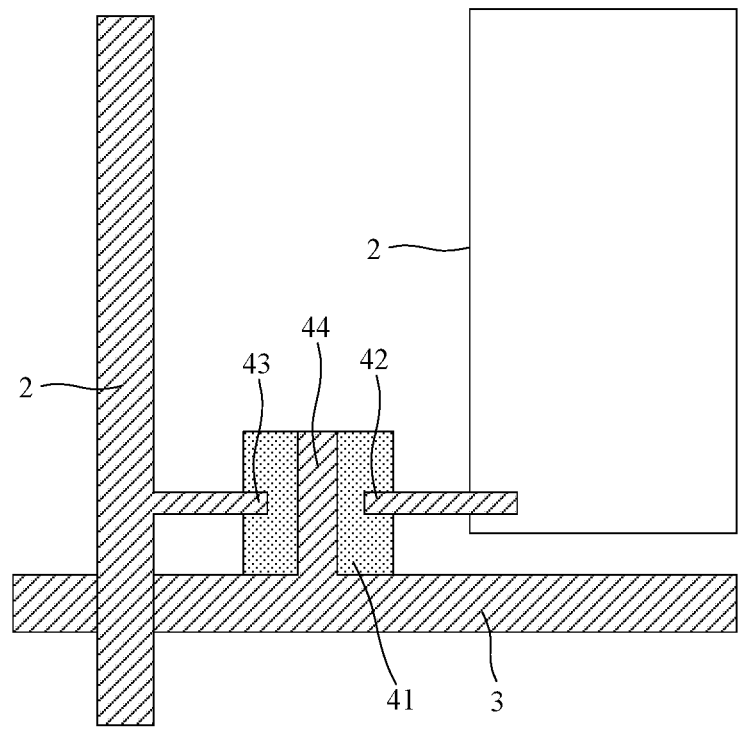
FIG. 13 is an enlarged schematic diagram of a partial region shown in FIG. 1.
Figure 14:
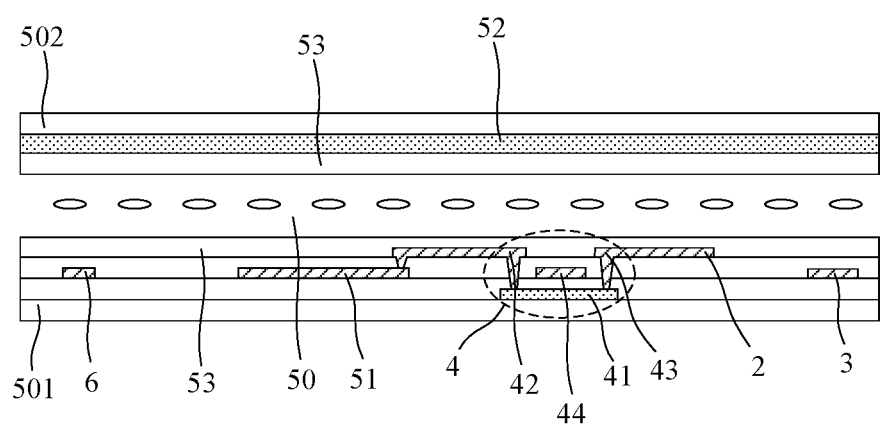
FIG. 14 is a cross-sectional view along line CC' shown in FIG. 9.

In some embodiments, as shown in FIG. 1, FIG. 12, FIG. 13 and FIG. 14, FIG. 12 is a cross-sectional view of a liquid crystal antenna in a partial region including transistors according to some embodiments of the present disclosure; FIG. 13 is an enlarged schematic diagram of a partial region shown in FIG. 1; and FIG. 14 is a cross-sectional view at CC' shown in FIG. 9. A distance L between the transistor 4 and the first electrode 51 of the corresponding liquid crystal phase shifter unit 1 is greater than 20 µm.

In some embodiments, the transistor 4 includes an active layer 41, a source 42, a drain 43, and a gate 44. One of the source 42 and the drain 43 is electrically connected to the first electrode 51. The other one of the source 42 and the drain 43 is electrically connected to the data line 2. The gate 44 is electrically connected to the scanning line 3. When the scanning line 3 has a turn-on level, the active layer 41 of the transistor 4 can generate carriers under control of the gate 44, that is, the source 42 is conducted with the drain 43. In this case, the voltage on the data line 2 can be transmitted to the first electrode 51 in the corresponding liquid crystal phase shifter unit 1 through the transistor 4. A gate insulating layer is provided between the active layer 41 and the gate 44. The source 42 and the drain 43 can be made of a same metal layer. An interlayer insulation layer is provided between a metal layer where the source 42 and the drain 43 are located and the gate 44. The first electrode 51 refers to one of the electrodes that is configured to drive the liquid crystal to rotate. A distance L between the transistor 4 and the corresponding first electrode 51 refers to a distance from the active layer 41 of the transistor 4 to an edge of the first electrode 51, for example, the distance L ranges from 20 µm and 500 µm. By setting a relatively large distance between transistor 4 and the corresponding first electrode 51, the adverse effect on the transistor 4 can be reduced by the high frequency signal on the first electrode 51. When the feeding network line 6 is arranged in a liquid crystal cell, the feeding network line 6 can be manufactured in a same layer as any metal layer in the transistor 4. For example, in the structure as shown in FIG. 12 and FIG. 14, the feeding network line 6 and the gate 44 are manufactured in the same layer, and can also be formed in the same layer as the source and drain or can be formed with a separate layer. The first electrode 51 can also be manufactured in the same layer as any metal layer in the transistor 4, for example, being manufactured in the same layer as the gate 44 or in the same layer as the source and drain or manufactured in a separate layer. Of course, the feeding network line 6 can also be provided outside the liquid crystal cell, which is not limited herein. FIG. 14 only illustrates a top gate structure, and can also be a bottom gate structure. The semiconductor layer can be made of amorphous silicon, low temperature polysilicon, or oxide semiconductor, which is not limited herein. As shown in FIG. 9, the radiators 56 are arranged symmetrically.

The above are merely some embodiments of the present disclosure, which, as mentioned above, are not configured to limit the present disclosure. Whatever within the principles of the present disclosure, including any modification, equivalent substitution, improvement, etc., shall fall within the scope of the present disclosure.

Finally, it should be noted that the technical solutions of the present disclosure are illustrated by the above embodiments, but not intended to limit thereto. Although the present disclosure has been described in detail with reference to the foregoing embodiments, those skilled in the art can understand that the present disclosure is not limited to the specific embodiments described herein, and can make various obvious modifications, readjustments, and substitutions without departing from the scope of the present disclosure.

What is claimed is:

1. A liquid crystal antenna, comprising:
   a plurality of liquid crystal phase shifter units arranged in an array;
   a plurality of data lines arranged along a first direction;
   a plurality of scanning lines arranged along a second direction,
   transistors corresponding to the plurality of liquid crystal phase shifter units, wherein each of the transistors comprises a first terminal electrically connected to one data line of the plurality of data lines, a second terminal electrically connected to a first electrode of one liquid crystal phase shifter unit of the plurality of liquid crystal phase shifter units, and a control terminal electrically connected to one scanning line of the plurality of scanning lines; and
   feeding network lines, each of which extends between at least two liquid crystal phase shifter units of the plurality of liquid crystal phase shifter units,
   wherein the feeding network lines comprise at least one first feeding network line extending along the first direction and at least one second feeding network line extending along the second direction, and the first direction intersects with the second direction; and
   wherein an ith scanning line of the plurality of scanning lines comprises a scanning line protrusion, one first feeding network line of the at least one first feeding network line corresponding to the ith scanning line and extending in the first direction is provided between the ith scanning line and an (i+1)th scanning line of the plurality of scanning lines, the scanning line protrusion protrudes toward a side facing away from the one first feeding network line corresponding to the ith scanning line, and the ith scanning line is at least one of the plurality of scanning lines; and/or
   a jth data line of the plurality of data lines comprises a data line protrusion, one second feeding network line of the at least one second feeding network line corresponding to the jth data line and extending along the second direction is provided between the jth data line and a (j−1)th data line of the plurality of data lines, the data line protrusion protrudes toward a side away from the one second feeding network line corresponding to the jth data line, and the jth data line is at least one of the plurality of data lines.

2. The liquid crystal antenna according to claim 1, wherein at least one of the feeding network lines comprises a first feeding terminal provided between two adjacent rows of liquid crystal phase shifter units of the plurality of liquid crystal phase shifter units, and the two adjacent rows of liquid crystal phase shifter units adjacent to the first feeding terminal comprise an nth row of liquid crystal phase shifter units of the plurality of liquid crystal phase shifter units and an (n+1)th row of liquid crystal phase shifter units of the plurality of liquid crystal phase shifter units; and
   one of the plurality of scanning lines corresponding to the nth row of liquid crystal phase shifter units is at least partially located at a side of the nth row of liquid crystal phase shifter units facing away from the first feeding terminal, and another one of the plurality of scanning lines corresponding to the (n+1)th row of liquid crystal phase shifter units is at least partially located at a side of the (n+1)th row of liquid crystal phase shifter units facing away from the first feeding terminal.

3. The liquid crystal antenna according to claim 1, wherein one of the feed network lines comprises a second feeding terminal provided between two adjacent columns of liquid crystal phase shifter units of the plurality of liquid crystal phase shifter units, and the two adjacent columns of liquid crystal phase shifter units adjacent to the second feeding terminal comprise an mth column of liquid crystal phase shifter units of the plurality of liquid crystal phase shifter units and an (m+1)th column of the liquid crystal phase shifter units of the plurality of liquid crystal phase shifter units; and
   one of the plurality of data lines corresponding to the mth column of liquid crystal phase shifter units is at least partially located at a side of the mth column of liquid crystal phase shifter units facing away from the second feeding terminal, and another one of the plurality of data lines corresponding to the (m+1)th column of liquid crystal phase shifter units is at least partially located at a side of the (m+1)th column of liquid crystal phase shifter units facing away from the second feeding terminal.

4. The liquid crystal antenna according to claim 2, wherein at least one of the transistors that corresponds to the nth row of liquid crystal phase shifter units is located at the side of the nth row of liquid crystal phase shifter units facing away from the first feeding terminal, and at least one of the transistors that corresponds to the (n+1)th row of liquid crystal phase shifter units is located at the side of the (n+1)th row of liquid crystal phase shifter units facing away from the first feeding terminal.

5. The liquid crystal antenna according to claim 3, wherein at least one of the transistors that corresponds to the mth column of liquid crystal phase shifter units is located at the side of the mth row of liquid crystal phase shifter units facing away from the second feeding terminal, and at least one of the transistors that corresponds to the (m+1)th column of liquid crystal phase shifter units is located at the side of the (m+1)th column of liquid crystal phase shifter units facing away from the second feeding terminal.

6. The liquid crystal antenna according to claim 1, wherein the ith scanning line is electrically connected to an ith row of liquid crystal phase shifter units of the plurality of liquid crystal phase shifter units, and the ith row of liquid crystal phase-shifter units comprises at least one first liquid crystal phase shifter unit and at least one second liquid crystal phase shifter unit; and
   wherein, in the second direction, one of the at least one first feeding network line is adjacent to one first liquid crystal phase shifter unit of the at least one first liquid crystal phase shifter unit and is located at a first side of the one first liquid crystal phase shifter unit, the scanning line protrusion is located at a second side of the one first liquid crystal phase shifter unit, and the first side and the second side are two opposite sides of the ith row of liquid crystal phase shifter units in the second direction, respectively.

7. The liquid crystal antenna according to claim 6, wherein the ith scanning line further comprises a scanning line non-protrusion, the scanning line non-protrusion is located at a first side of one second liquid crystal phase shifter unit of the at least one second liquid crystal phase shifter unit, and one of the at least one first feeding network line that is adjacent to the one second liquid crystal phase shifter unit is located at a second side of the one second liquid crystal phase shifter unit.

8. The liquid crystal antenna according to claim 1, wherein the jth data line is electrically connected to a jth column of liquid crystal phase shifter units of the plurality of liquid crystal phase shifter units, and the jth column of liquid crystal phase shifter units comprises at least one third liquid crystal phase shifter unit and at least one fourth liquid crystal phase shifter unit; and wherein, in the first direction, at least one of the at least one second feeding network line is adjacent to one third liquid crystal phase shifter unit of the at least one third liquid crystal phase shifter unit and is located at a third side of the one third liquid crystal phase shifter unit, the data line protrusion is located at a fourth side of the one third liquid crystal phase shifter unit, and the third side and the fourth side are two opposite sides of the jth column of liquid crystal phase shifter units in the first direction, respectively.

9. The liquid crystal antenna according to claim 8, wherein the jth data line further comprises a scanning line non-protrusion, the scanning line non-protrusion is located at a third side of one fourth liquid crystal phase shifter unit of the at least one fourth liquid crystal phase shifter unit, and one of the at least one second feeding network line that is adjacent to the one fourth liquid crystal phase shifter unit is located at a fourth side of the one fourth liquid crystal phase shifter unit.

10. The liquid crystal antenna according to claim 3, wherein the (m−1)th column of liquid crystal phase shifter units are electrically connected to an (m−1)th data line of the plurality of data lines, and are located between the (m−1)th data line and an mth data line of the plurality of data lines.

11. The liquid crystal antenna according to claim 1, wherein the ith scanning line and the jth data line are electrically connected to a first specific liquid crystal phase shifter unit of the plurality of liquid crystal phase shifter units through a corresponding one of the transistors;

wherein the ith scanning line comprises a first segment extending along the first direction and a second segment extending along the second direction, the first segment is connected to the second segment, the first segment is located between the first specific liquid crystal phase shifter unit and an (i−1)th row of liquid crystal phase shifter units of the plurality of liquid crystal phase shifter units, and the second segment is located between the first specific liquid crystal phase shifter unit and an (j+1)th column of liquid crystal phase shifter units of the plurality of liquid crystal phase shifter units;

wherein the jth data line comprises a third segment extending along the first direction and a fourth segment extending along the second direction, the third segment is connected to the fourth segment, the third segment is located between the first specific liquid crystal phase shifter unit and an (i+1)th row of liquid crystal phase shifter units of the plurality of liquid crystal phase shifter units, and the fourth segment is located between the first specific liquid crystal phase shifter unit and a (j−1)th column of liquid crystal phase shifter units of the plurality of liquid crystal phase shifter units; and wherein one of the transistors that corresponds to the first specific liquid crystal phase shifter unit is located at a junction between the first segment and the fourth segment.

12. The liquid crystal antenna according to claim 11, wherein one of the at least one second feeding network line is provided between the first specific liquid crystal phase shifter unit and the (j+1)th column of liquid crystal phase shifter units;

wherein one of the at least one first feeding network line is provided between the first specific liquid crystal phase shifter unit and the (i+1)th row of liquid crystal phase shifter units; and wherein none of the feeding network lines is provided between the first specific liquid crystal phase shifter unit and the (i−1)th row of liquid crystal phase shifter units, and none of the feeding network lines is located between the first specific liquid crystal phase shifter unit and the (j−1)th column of liquid crystal phase shifter units.

13. The liquid crystal antenna according to claim 1, wherein the ith scanning line and the jth data line are electrically connected to a second specific liquid crystal phase shifter unit of the plurality of liquid crystal phase shifter units through a corresponding one of the transistors;

wherein the ith scanning line comprises a fifth segment extending along the first direction and a sixth segment extending along the second direction, the fifth segment is connected to the sixth segment, the fifth segment is located between the second specific liquid crystal phase shifter unit and an (i+1)th row of liquid crystal phase shifter units of the plurality of liquid crystal phase shifter units, and the sixth segment is located between the second specific liquid crystal phase shifter unit and a (j−1)th column of liquid crystal phase shifter units of the plurality of liquid crystal phase shifter units;

wherein the jth data line comprises a seventh segment extending along the first direction and an eighth segment extending along the second direction, the seventh segment is connected to the eighth segment, the seventh segment is located between the second specific liquid crystal phase shifter unit and the (i+1)th row of liquid crystal phase shifter units, and the eighth segment is located between the second specific liquid crystal phase shifter unit and the (j−1)th column of liquid crystal phase shifter units; and wherein one of the transistors that corresponds to the second specific liquid crystal phase shifter unit is located at an end of the fifth segment away from the sixth segment.

14. The liquid crystal antenna according to claim 13, wherein one of the at least one second feeding network line is provided between the second specific liquid crystal phase shifter unit and the (j−1)th column of liquid crystal phase shifter units;

wherein one of the at least one first feeding network line is provided between the second specific liquid crystal phase shifter unit and an (i−1)th row of liquid crystal phase shifter units of the plurality of liquid crystal phase shifter units; and wherein none of the feeding network lines is provided between the second specific liquid crystal phase shifter unit and a (j+1)th column of liquid crystal phase shifter units of the plurality of liquid crystal phase shifter units.

15. The liquid crystal antenna according to claim 1, wherein each of the plurality of liquid crystal phase shifter units comprises the first electrode, a liquid crystal layer, and a second electrode, wherein the first electrode and the second electrode are located at two opposite sides of the liquid crystal layer, respectively; and one of the feeding network lines and the first electrode of a corresponding one of the plurality of liquid crystal phase shifter units are arranged in a same layer, and a gap is formed between the one of the feeding network lines and the corresponding one of the plurality of liquid crystal phase shifter units.

16. The liquid crystal antenna according to claim 15, further comprising:
   a first substrate and a second substrate opposite to the first substrate,
   wherein the plurality of data lines and the first electrode are located at a side of the first substrate close to the second substrate,
   wherein the second electrode is located at a side of the second substrate close to the first substrate; and
   wherein the liquid crystal layer is located between the second electrode and the first electrode.

17. The liquid crystal antenna according to claim 1, further comprising:
   a first substrate and a second substrate opposite to the first substrate,
   wherein each of the plurality of liquid crystal phase shifter units comprises the first electrode, a liquid crystal layer, and a second electrode, wherein the first electrode and the second electrode are located at two opposite sides of the liquid crystal layer, respectively;
   wherein the first electrode is located at a side of the liquid crystal layer close to the first substrate, and the second electrode is located at a side of the liquid crystal layer close to the second substrate; and
   wherein the feeding network lines are located between the liquid crystal layer and the first substrate, and one of the feeding network lines and the first electrode of one of the plurality of liquid crystal phase shifter units are arranged at different layers with intervals and overlap with each other.

18. The liquid crystal antenna according to claim 1, further comprising:
   a first substrate and a second substrate opposite to the first substrate,
   wherein each of the plurality of liquid crystal phase shifter units comprises the first electrode, a liquid crystal layer, and a second electrode, wherein the first electrode and the second electrode are located at two opposite sides of the liquid crystal layer, respectively;
   wherein the first electrode is located at a side of the liquid crystal layer close to the first substrate, and the second electrode is located at a side of the liquid crystal layer close to the second substrate; and
   wherein the first substrate is located between the feeding network lines and the liquid crystal layer, and one of the feeding network line overlaps with the first electrode of one of the plurality of liquid crystal phase shifter units.

19. The liquid crystal antenna claim 16, wherein each of the plurality of liquid crystal phase shifter units further comprises at least one radiator located at a side of the second substrate facing away from the liquid crystal layer; and
   wherein the second electrode has a hollow structure corresponding to each of the at least one radiator.

20. The liquid crystal antenna according to claim 1, wherein a distance between one of the transistors and the first electrode of a corresponding one of the plurality of liquid crystal phase shifter units is greater than 20 µm.

* * * * *